July 30, 1957     M. J. OLSCHWANG     2,800,804
AUTOMATIC TORQUE MULTIPLIER

Filed March 24, 1954     3 Sheets—Sheet 1

INVENTOR.
MORRIS J. OLSCHWANG
BY
Van Deventer & Shively
ATTORNEYS.

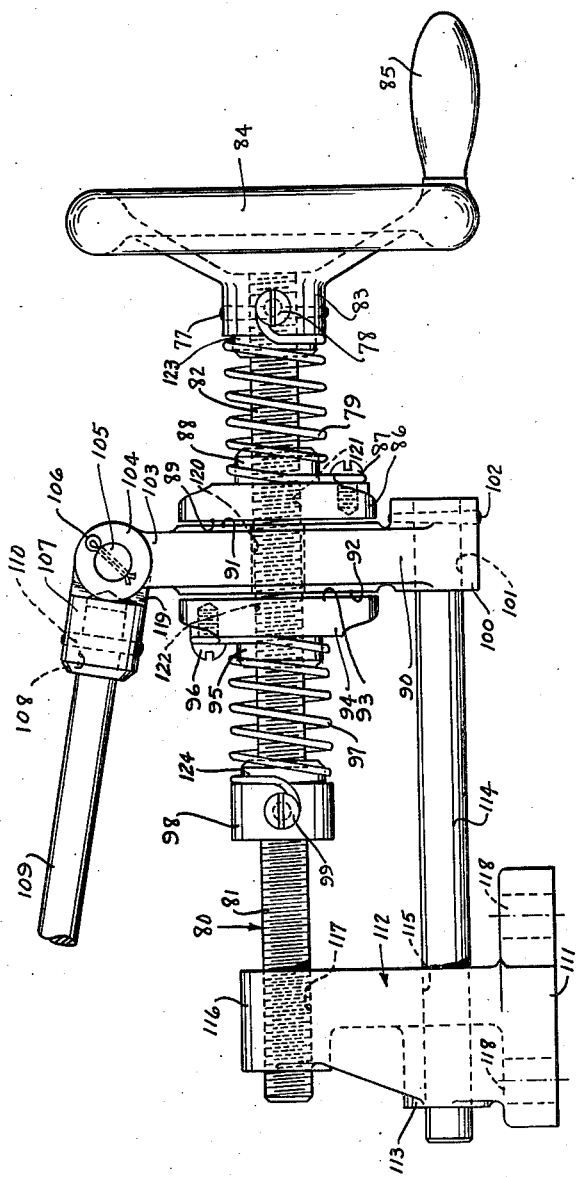

United States Patent Office 2,800,804
Patented July 30, 1957

2,800,804

AUTOMATIC TORQUE MULTIPLIER

Morris J. Olschwang, New York, N. Y.

Application March 24, 1954, Serial No. 418,419

5 Claims. (Cl. 74—424.8)

This invention relates to improvements in torque multipliers wherein screw threads are employed to exert pressure and has for a principal object the provision of a rotatable screw having a given number of threads per inch thereon and a second screw having a greater number of threads per inch than said given number, a threaded hole in a first member engaged by said first threads, a second member moved toward said first member as said screws are rotated, a nut and friction disc having a threaded hole therein engaged by the threads of said second screw and adapted to frictionally engage said second member as it meets resistance due to reaction of said second member with said first member or any article therebetween, and thereby cause said second screw in cooperation with said first screw, to exert a multiplied or greater torque upon said second member.

An object of the invention is the provision, in a device of the character described, of a screw; a portion of which is threaded with N threads to the inch and the remainder of which is threaded with $N+X$ threads to the inch; a stationary member having a hole therein threaded with N threads to the inch, a movable member freely movable on said screw and having opposed frictional faces thereon, a first friction disc threadedly engaged with the $(N+X)$ threads on one portion of said screw, a second friction disc threadedly engaged with said $(N+X)$ threads on the opposite site of said movable member, rotatable means secured on said screw in spaced relation to said first disc, spring means embracing said screw and secured to said rotatable means and to said first disc, a collar fixed on said screw between said first and said second threads in spaced relation to said second disc, a second spring means embracing said screw and having one end secured to said second disc and its other end secured to said collar, and a connection between said movable member and means to be moved reciprocally thereby, so that torque multiplication may be exerted by said device in either direction.

Other objects and advantages of the invention will be apparent to those skilled in the art upon a study of this specification and the accompanying drawings.

Referring to the drawings which are given by way of example to illustrate the invention:

Figure 8 is an elevation wherein my torque multiplier is arranged to exert multiplied torque in either direction.

Figure 1:
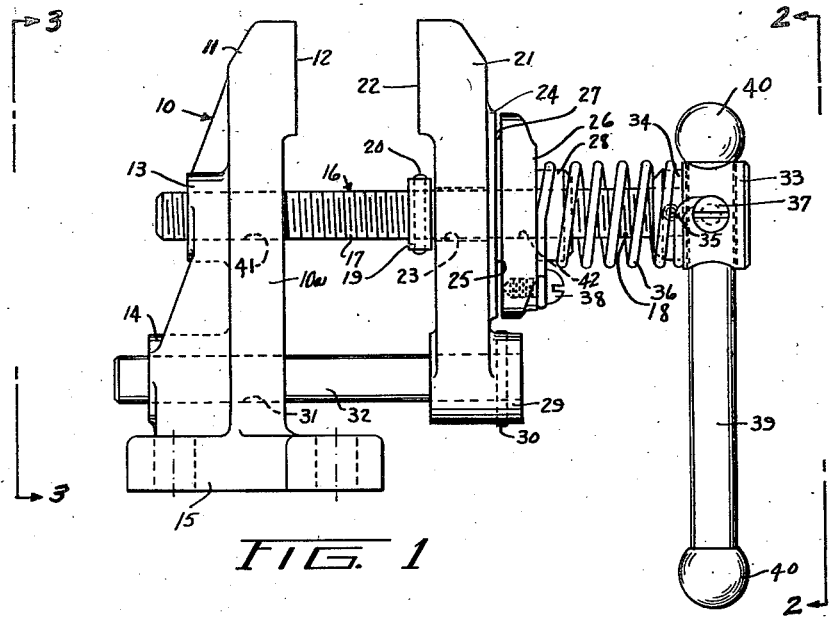
Figure 1 is a side elevation of a vise employing my new and improved torque multiplier.
Figure 3:
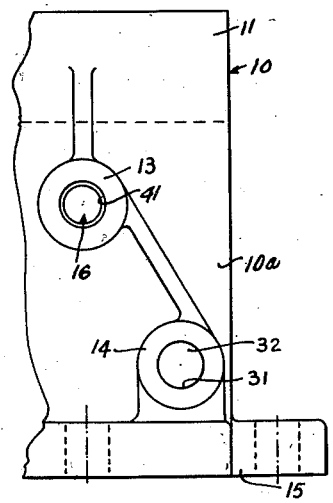
Figure 3 is a rear end elevation as seen from the viewing line 3—3 of Figure 1.
Figure 2:
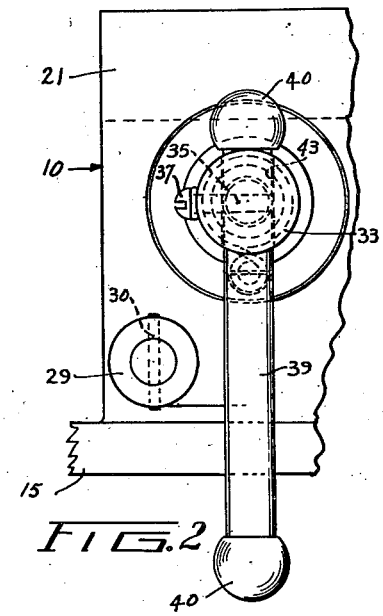
Figure 2 is a front end elevation as seen from the viewing line 2—2 of Figure 1.

Referring first to Figures 1, 2 and 3, the vise 10 has a body 10a, carrying a stationary jaw 11 with an overhanging engageable face 12, and a base 15 formed integral therewith. A boss 13 thereon has a threaded hole 41 therein engaging threads 17 on a screw 16. The screw 16 has one portion 17 which is threaded with "N" threads to the inch, and another portion 18 which is threaded with "$N+X$" threads to the inch.

A collar 19 is secured on the screw 16 by means of a taper pin 20. A movable jaw 21 has an engageable face 22 adapted to cooperate with the face 12, and it has transversely spaced bosses 29 with holes therein to accommodate guide rods 32, which are secured therein by means of taper pins 30.

The guide rods 32 form working fits in holes 31 formed in transversely spaced bosses 14 on the stationary jaw 11.

The movable jaw 21 has a clearance hole 23 therein for the screw 16, and disposed about this hole is a faced boss 24 having a friction face 25.

A disc nut 26 has a threaded hole 42 therethrough which engages the second threaded portion 18 of the screw 16, and which carries a friction face 27 to cooperate with the face 25 in a manner to be presently explained. Integral with the disc nut 26, is a boss 28 which is embraced by one end of a helical spring 36, and the terminus of said end is in the form of a loop or eye through which a screw 38 passes to engage a threaded hole in the disc nut 26.

On the outer end of the screw portion 18 is a stepped boss 33 having a shank portion 34 of smaller diameter, which may be secured on the extremity of the threaded portion in any suitable manner, for example by threading a hole therein to fit the threads 18 and by the use of a taper pin 35 to fix it thereon.

The boss 33 has a cross hole 43 therein, and a shaft 39 forms a free working fit therein and carries balls 40 on each end thereof, thereby forming a handle for operating the vise.

Operation

With the faces 12 and 22 of the jaws 11 and 21, respectively, of the vise in the open position, a piece of work may be placed between them and closure accomplished by rotating the pressure screw 16 by means of the lever shaft 39. This will advance the screw within the threaded hole 41 in the body 10a, carrying disc nut 26, which will not turn readily upon the screw, along with it and in turn pushing the movable jaw 21 toward the work. However, when contact with the work is made by the faces 12 and 22 of the jaws, a sharp increase in pressure occurs on the friction surface 27 of disc nut 26 as it is jammed against the adjoining surface 25 of the movable jaw 21. This prevents the disc nut 26 from rotating further with the pressure screw and continued rotation of the screw will cause it to advance, against the spring tension, within the threaded hole 42 of the disc nut 26, as well as the hole 41 in the body 10a.

Now, if the threads 41 and 17, and 42 and 18 were cut to have the same amount of lead, no additional pressure would be brought to bear on movable jaw 21 with continued rotation of the screw. However, because the two threads are not the same, the jaws 11 and 21 will be further drawn together with each revolution of the pressure screw by an amount equal to the difference in lead between the threads. For example, if "N" is equal to 10 and "X" is equal to 1, the jaws of the vise will tend to close an amount equal to approximately 0.009" (one-tenth of an inch minus one-eleventh of an inch) with each rotation of the screw after contact has been made by jaws 12 and 22 with the work, but they will have closed at the rate of 0.1″ per revolution while the travel of the movable jaw 21 was relatively unimpeded so that the nut 26 and the screw 16 rotated as a unit. The mechanical advantage thus gained is self-evident. It should be noted that the amount of travel of 21 after the jaws have engaged the work is dependent only upon the difference in lead between the two threads, regardless of the lead of each individual thread. Thus, it will be evident that large threads having great mechanical strength and a long lead, with inherent high efficiency, permitting rapid traverse when lightly loaded, may be used without sacrificing the leverage or torque which must be available when pressure is to be applied to the work. The collar 19 serves its function when the movable jaw 21 is being backed away from the work.

In the arrangement shown in Figure 1, the use of the spring means 36 is not absolutely necessary for the device to function. It has been added as a means to prevent the rotation of the disc nut 26 on the screw portion 18 until appreciable resistance against movement is encountered by the disc nut, and as a means of returning the disc nut to its proper position during the movement of the screw 16 in the opposite direction to release the work. Instead of the spring means, the disc nut 26 may be held in place by a latch, a dog, or other engaging means, which may be released electrically, mechanically or manually as desired.

Figure 4:
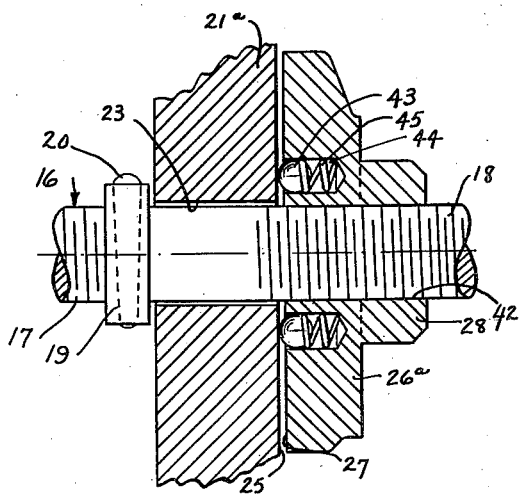
Figure 4 is a fragmentary view partly in section of a modification, and shows spring loaded balls in a friction disc nut corresponding to the nut shown in Figure 1.

In the fragmentary view Figure 4, the same numerals appear on corresponding elements, but those of which are modified have the original numerals followed by the letter "a," and those which represent new elements have new numerals thereon.

Figure 4 shows an arrangement devised to promote relatively frictionless rotation of the disc nut 26 against face 25 when the jaw 21 is free to move under the application of comparatively small forces. After the jaw faces 12 and 22 come into contact with the work, further rotation of the pressure screw 16 causes balls 43 to move further into the holes 44 against the urge of springs 45, thereby bringing the friction surface 27 of the disc nut 26 into intimate contact with the surface 25 of the movable member 21.

Figure 5:
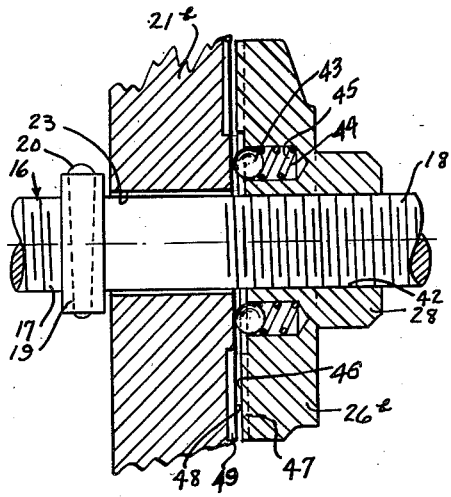
Figure 5 is a view, similar to Figure 4, except that the friction disc nut has serrations or teeth formed thereon, and the cooperative surface of the movable member has matching serrations or teeth thereon.

Figure 5 shows an arrangement constituting a further modification wherein the disc nut 26b has an engageable surface 46 provided with teeth or serrations 47 which are adapted to be engaged with corresponding teeth 49 formed on a face 48 on the movable jaw 21b. Until the teeth 47 and 49 are engaged, the movable jaw is moved toward the stationary jaw or toward the work by the screw threads 17. As soon as the work is engaged by the jaws, the reaction causes compression of the springs 45 and the subsequent engagement of the teeth 47 and 49 which prevent rotation of the disc nut 26b with the screw 16, so that further rotation of the screw by means of the handle 39 causes the portion 18 of the screw to effect torque multiplication on the disc nut and the movable jaw.

As a further modification, the engageable surfaces 25 and/or 27 of Figure 4, may be lightly knurled or they may be faced either one or both, with braking material or any other means providing friction.

Figure 6:
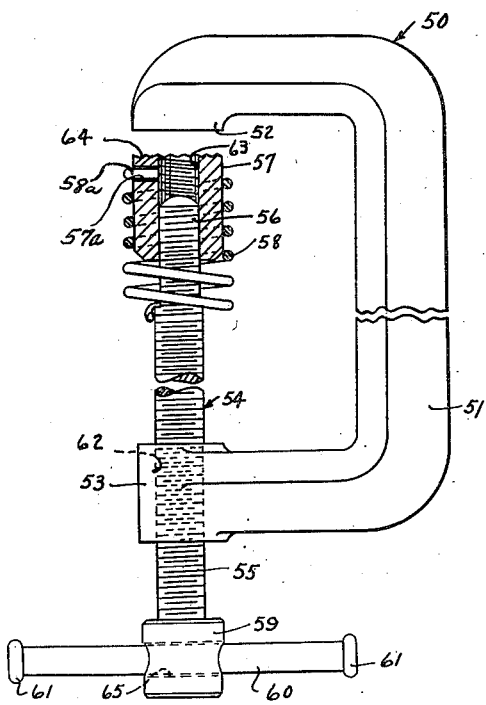
Figure 6 is an elevation of a C clamp embodying my improved torque multiplication.

Referring now to Figure 6, my new principle is applied to a C clamp 50, which has a main open body 51 with a boss 53 thereon spaced from an engaging face 52. The boss 53 has a threaded hole 62 therethrough. A screw, generally designated by the numeral 54, has a portion 55 which has threads of one lead thereon engaging the threaded hole 62. The screw has another portion 56 which is smaller in diameter than the portion 55 and which is provided with a number of threads per inch at least equal to the number of threads per inch on the portion 55 plus X. Thus, if X equals 1, the threads per inch on the portion 56 would be N+1. The reason for the smaller diameter of the portion 56 is to enable that portion to pass through the hole 62, which is internally threaded to accommodate the portion 55 of the screw.

A bushing nut 57 has an internal thread 63 which is engaged with the screw portion 56, and the end face 64 is provided with a friction surface in any suitable manner, as by producing such surface as an integral part of said end or by applying thereto means carrying such a surface. A helical spring 58 has one end secured to the bushing nut in any suitable manner, for example, by inserting the bent end 58a thereof in a radial hole 57a in the bushing nut 57, and the other end is secured to the screw portion 55 in any suitable manner. A head boss 59 is secured to the end of or formed integral with the screw and it has a cross-hole 65 therein forming a working fit with the handle shaft 60, and the shaft 60 has enlarged heads 61, 61 secured to or formed on the ends thereof.

Now, when the clamp is used to clamp two or more pieces together, the screw 54 is "backed up" in the usual manner and, with the engaging face 52 on one side of the work, the screw 54 is turned to the right by means of the shaft handle 60. As soon as the face 64 engages the work sufficiently for the friction surface to arrest the rotation of the bushing nut 57, the latter functions to multiply the pressure applied to the work.

Figure 7:
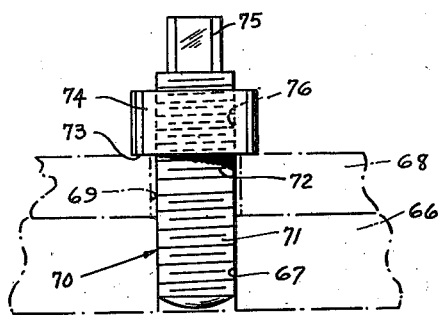
Figure 7 is a modification for securing plates together.

Referring to Figure 7, I show a modification wherein a stud 70 has a portion 71 with "N" threads to the inch and a portion 72 which has N+X threads to the inch. A bushing nut 74 has a threaded hole 76 therein which is engaged with the threads on the portion 72, and it has a frictional face 73. Assume that it is desired to secure two plates together, such as a plate 66, having a threaded hole 67 therein to accommodate the threaded portion 71; and a second plate 68 having a clearance hole 69 therethrough, the plates are placed together with the holes therein in alignment, then the screw portion is passed through the hole 69 and is engaged with the threads in the hole 67. A wrench may be used on a squared portion 75 to turn the screw, and as soon as the frictional face 73 of the bushing nut 74 encounters the upper surface of the plate 68, rotation of the bushing nut is arrested and the bushing nut functions to multiply the pressure applied to said upper surface.

Referring now to Figure 8, a rod 109 may be connected to various devices which need to be operated in one direction and in the opposite direction with torque multiplication in both directions, such as valves, dampers, switching devices, controllers, braking means and many other "push-pull" devices. This rod may be operatively connected to a fitting 107 having an internal hole 108 therein into which the end of the rod 109 fits, the latter being secured therein by means of a taper pin 110. The fitting 107 has a tongue portion 119 which forms a working fit between the inner faces of a bifurcated boss 104. The tongue portion 119 and the bifurcated boss have aligned holes therein to accommodate a clevis pin 105, and it is retained therein in any suitable manner, as for example by means of cotter pins, one of which is shown at 106.

A generally disc-shaped member 90 has a neck portion 103 carrying the bifurcated boss. The member 90 also carries opposite frictional faces 91 and 92 and has a central clearance hole 120 formed therein to clear a screw, to be presently described. The member 90 also has formed integral therewith a pair of transversely spaced bosses 100, each of which has a hole 101 therein into which one end of a guide rod 114 is pressed. A tapered hole is formed in the boss and said rod to accommodate a taper pin 102.

A stationary member 112 carries a boss 116 having a threaded hole 117 therein to cooperate with a threaded portion 81 of a screw 80. The threads 81 may have "N" threads to the inch, for example. The screw 80 has another portion 82, which may have "N+X," or "N+1" threads per inch, for example. A disc nut 86 has a threaded hole 121 therein engaging the screw portion 82 to one side of the member 90, and a second disc nut 94 has a threaded hole 122 therein engaging the screw portion 82 to the other side of the member 90. The disc nuts 86 and 94 have friction faces 89 and 93 adjacent to the friction faces 91 and 92, respectively, on the member 90.

The disc nut 86 has a hub 88, and axially spaced therefrom is the hub 83 of a hand wheel 84, carrying a handle 85. The hub 83 is positively fixed on the outer end of the screw portion 82 and is fixed thereon by means of a taper pin 77 in a tapered hole therethrough. The hub 83 has a portion 123 of reduced diameter over which one end of a helical spring 79 is positioned, and a screw 78 passes through an eye in said end of the spring and engages a suitable radial and threaded hole in the hub 83. The other end of the spring is positioned upon the hub 88 and carries an eye or loop through which a screw 87 passes to secure it to the disc nut 86.

The disc nut 94 has a hub portion 95, extending in a direction away from the member 90, and axially spaced therefrom to the left, as seen in Figure 8, is a sleeve member 98 which is positively fixed on the screw 80 adjacent to the junction of the portions 81 and 82. The sleeve member 98 has a hub portion 124 which extends toward the hub 95, and a helical spring 97 has one end located by the boss 95 and secured to the disc nut 94 by means of a screw 96. The other end of the spring 97 is located by the boss 124 and is secured to the sleeve member 98 by means of a screw 99.

The stationary member 112 also has a pair of transversely spaced bosses 113 with holes 115 therein in which the rods 114 form working fits. The member 112 also has a base 111 with holes 118 therein to accommodate mounting screws.

As an example of the use of the device shown in Figure 8, assume that the rod 109 is connected to a valve, through suitable mechanism, to be "pushed" to an open position and "pulled" to a closed position. The operator, by means of the handle 85, turns the wheel (and the screw 80) in a clockwise direction as seen from the right side of Figure 8. This causes the screw portion 81 to advance the member 90 and the associated elements toward the left, until a point is reached where the rod 109 immediately encounters appreciable resistance, so that the face 89 frictionally engages the face 91 on the member 90, thereby arresting rotation (if any) of the disc nut 86 and causing the disc nut 86 to act against the member 90 (and consequently the movable element of said valve) with multiplied pressure to move the valve element from its seat and to rapidly open the same.

To close the valve, the wheel 84 and the screw 80 are rotated in a counter-clockwise direction, thereby rapidly and freely moving the movable element of the valve toward its seat. As soon as the element reaches the seat and imposes resistance upon the rod 109, the face 93 of disc nut 94 engages the face 92 of the member 90, thereby causing the screw portion 82 to cause the disc nut 94 to impose multiplied pressure upon the member 90 and through the mechanism between it and the movable element, thereby force the latter to tightly engage its seat.

Although I have shown and described herein several applications of my torque multiplier by way of example, it will be understood that many other modifications may be made within the scope of the appended claims without departing from the function of the invention. Among the possible modifications is the substitution of a suitable spiral cam and follower for any of the screw threads heretofore described.

By lead is meant the amount of linear travel with each revolution of the screw. With single-thread screws the pitch is equal to the lead; with double-thread screws the pitch is one-half the lead; with triple-thread screws it is one-third the lead and so on. Obviously screws of any pitch or lead may be used so long as the proper relationship between the lead of the two screws in the device is established.

I claim:

1. In a device of the character described, a stationary member having a base adapted to be secured to a support, a threaded hole formed in said member, a screw having a threaded portion with "N" threads to the inch and having a second portion with $(N+X)$ threads to the inch, a plate member having a clearance hole therethrough for said screw and having opposite friction faces, means carried by said plate member and adapted to be operatively connected via push-pull rod means to a point of use, said plate member also carrying guide means, said guide means being adapted to reciprocate in corresponding holes in said support, a first disk nut threadedly engaging said second portion on one side of said plate member and having a cooperative frictional face adjacent to one of the friction faces on said plate member, a second disk nut adjacent to the opposite friction face of said plate member and threadedly engaging said second portion of said screw, said second disk nut having a cooperative frictional face adjacent to the opposite friction face of said plate member, a collar secured to said screw adjacent to the junction of said threaded portions, a crank handle secured on the outer end of said second portion, helical spring means between and secured to both said handle and said first disk member, a second helical spring means between and secured to both said second disk member and said collar, said device being adapted to automatically exert multiplied force against said plate member and means connected thereto each time one of said disk members frictionally engages said plate member regardless of the direction said screw is rotated.

2. In a device of the character described, a rotatable shaft, a movable member, a reaction means cooperating with said movable member, a first spiral mechanism having a lead equal to "X" and a second spiral mechanism having a lead equal to "Y," said first spiral mechanism acting independently to cause said movable member to travel a distance "X" with each complete turn of said rotatable shaft when the reaction imposed by said reaction means is less than "Z," said first spiral mechanism acting in cooperation with said second spiral mechanism to cause said movable member to travel a distance "$(X-Y)$" with each complete turn of said rotatable shaft when the reaction imposed by said reaction means is equal to or greater than "Z," and a second movable member functioning to render said device effective in either of two directions of movement of said members.

3. The invention according to claim 2, in which said movable members rotate with said rotatable shaft when the reaction imposed by said reaction means is less than "Z," one of said movable members continuing to rotate with said shaft, and the other of said movable members ceasing to rotate when the reaction between said other movable member and said reaction means is equal to or greater than "Z."

4. In a device of the character described, a stationary member, a rotatable shaft, a displaceable member, a reaction means cooperating with said displaceable member, a first screw having threads of one lead, a second screw having threads of another lead, a threaded hole in said stationary member engaging the threads of said first screw, a threaded hole in said displaceable member engaging the threads of said second screw, said first screw cooperating independently with said rotatable shaft and said stationary member to cause a movement of said displaceable member of a given amount with each complete turn of said rotatable shaft in one direction when the reaction due to said reaction means is below a predetermined value, a second displaceable member substantially duplicating said first displaceable member and so arranged relative to said first member and said reaction means that pressure may be exerted on said reaction means by turning said shaft in either of two directions.

5. In a device of the character described, a stationary member, a threaded hole in said member, a screw having a threaded portion with "N" threads to the inch and having a second portion with $(N+X)$ threads to the inch, a plate member having opposite friction faces, means carried by said plate member and adapted to be operatively connected to a point of use, a first disk member threadedly engaging said second portion on one side of said plate member and having a cooperative frictional face adjacent to one of the friction faces on said plate member, a second disk member adjacent to the opposite friction face of said plate member, turning means secured to said screw, said device being adapted to automatically exert multiplied force against said plate member and the means carried thereby each time one of said disk members frictionally engages said plate member regardless of the direction said screw is rotated.

References Cited in the file of this patent

UNITED STATES PATENTS

| | | |
|---|---|---|
| 250,464 | Thompson | Dec. 6, 1881 |
| 628,701 | Dyer | July 11, 1899 |
| 1,288,612 | Kaelin | Dec. 24, 1918 |
| 2,148,800 | Billings | Feb. 28, 1939 |

FOREIGN PATENTS

| | | |
|---|---|---|
| 22,933 | Great Britain | Oct. 8, 1912 |